United States Patent [19]

Balasubramanian et al.

[11] Patent Number: 5,606,643

[45] Date of Patent: Feb. 25, 1997

[54] REAL-TIME AUDIO RECORDING SYSTEM FOR AUTOMATIC SPEAKER INDEXING

[75] Inventors: Vijay Balasubramanian, Princeton, N.J.; Francine R. Chen; Philip A. Chou, both of Menlo Park, Calif.; Donald G. Kimber; Alex D. Poon, both of Mountain View, Calif.; Karon A. Weber, San Francisco, Calif.; Lynn D. Wilcox, Portola Valley, Calif.

[73] Assignee: Xerox Corporation, Stamford, Conn.

[21] Appl. No.: 226,580

[22] Filed: Apr. 12, 1994

[51] Int. Cl.⁶ .................................................. G01L 9/00
[52] U.S. Cl. .................................. 395/2.52; 395/2.54
[58] Field of Search ............................. 381/41–43, 82; 395/2, 2.52

[56] References Cited

U.S. PATENT DOCUMENTS

| | | | |
|---|---|---|---|
| 4,783,804 | 11/1988 | Juang et al. | 381/43 |
| 4,837,830 | 6/1989 | Wrench et al. | 381/42 |
| 5,199,077 | 3/1993 | Wilcox et al. | 381/43 |
| 5,202,952 | 4/1993 | Gillick et al. | 395/2 |
| 5,271,088 | 12/1993 | Bahler | 395/2 |
| 5,406,634 | 4/1995 | Anderson et al. | 381/82 |
| 5,473,728 | 12/1995 | Luginbuhl et al. | 395/2.52 |

OTHER PUBLICATIONS

Euler et al., "Statistical segmentation and word modeling techniques in isolated word recognition", ICASSP'90: Acoustics, speech & Signal Processing Conference, pp. 745–748.

Ostendorf et al., "The stochastic segment model for continuous speech recognition", 1991, Signals, Systems & computers, 1991 Asilomar Conference, pp. 964–968.

Iwasaki et al., "A real time Speaker–independent continuous speech recognition system", 1992, Patter Recognition, 1992 11th International Conference, pp. 663–666.

Russell, "A segmental HMM for speech pattern modeling", ICASSP'93:Acoustics, Speech & Signal Processing Conference, vol. II, pp. 499–502.

Wilcox et al., "Segmentation of speech using speaker identification", ICASSP'94: Acoustics, Speech & Signal Processing Conference, vol. I, pp. 161–164.

Gish et al., "Segregation of Speakers for Speech Recognition and Speaker Identification," Proc. Int. Conf. Acoustics, Speech and Signal Processing, May 1991, vol. 2 pp. 873–876.

Siu et al., "An Unsupervised Sequential Learning Algorithm for the Segmentation of Speech Waveforms with Multiple Speakers," Proc. Int. Conf. Acoustics, Speech and Signal Processing, Mar. 1992, vol. 2 pp. 189–192.

Sugiyama et al., "Speech Segmentation and Clustering Based on Speaker Features," Proc. Int. Conf. Acoustics, Speech and Signal Processing, Apr. 1993, vol. 2, pp. 395–398.

Matsui et al., "Comparison of Text–Independent Speaker Recognition Methods Using VQ–Distortion and Discrete/Continuous HMMs," Proc. Int. Conf. Acoustics, Speech and Signal Processing, Mar. 1992, vol. 2, pp. 157–160.

*Primary Examiner*—Allen R. MacDonald
*Assistant Examiner*—Vijay B. Chawan
*Attorney, Agent, or Firm*—R. Christine Jacobs; Tracy L. Hurt

[57] ABSTRACT

A processor controlled system for correlating an electronic index according to speaker for audio data being recorded in real time. The system includes a source of training data for each of the plurality of individual speakers and audio input system for providing real time audio data including speech for the individual speakers. The audio data is converted into spectral feature data by an audio processor, and is simultaneously recorded on a storage medium by a recording device. A system processor accepts the training data to create individual speaker models, which are combined in parallel to form a speaker network. The system processor then accepts the spectral feature data of the audio data and, using the speaker network, determines segments in the audio data corresponding to each speaker.

8 Claims, 10 Drawing Sheets

REAL-TIME AUDIO RECORDING SYSTEM FOR AUTOMATIC SPEAKER INDEXING

CROSS REFERENCE TO RELATED APPLICATIONS

The present invention is directly related to an invention that is the subject matter of a concurrently filed, commonly assigned U.S. patent application having the following serial number and title:

Ser. No. 08/226,519, Attorney Docket No. D/94123, "SEGMENTATION OF AUDIO DATA FOR INDEXING OF CONVERSATIONAL SPEECH FOR REALTIME OR POSTPROCESSING APPLICATIONS," and is herein incorporated by reference.

Ser. No. 08/226,525, Attorney Docket No. D/94186, "UNSUPERVISED SPEAKER CLUSTERING FOR AUTOMATIC SPEAKER INDEXING OF RECORDED AUDIO DATA," and is herein incorporated by reference.

Ser. No. 08/226,523, Attorney Docket No. D/94186Q, "IMPROVED METHOD OF SPEAKER CLUSTERING FOR UNKNOWN SPEAKERS IN CONVERSATIONAL AUDIO DATA," and herein incorporated by reference.

FIELD OF THE INVENTION

The present invention relates to segmentation by speaker of conversational speech for recorded or real-time audio data streams.

More specifically, the invention relates to a system for automatically segmenting conversational speech during real-time recording of audio data including known speakers.

BACKGROUND OF THE INVENTION

Audio and video recordings have become commonplace with the advent of consumer grade recording equipment. It is no longer rare to find a business meeting, a lecture, or a birthday party being recorded as a historical record for later reviewing. Unfortunately, both the audio and video mediums provide few external or audio clues to assist in accessing the desired section of the recording. In books, indexing is provided by the table of contents at the front and the index at the end, which readers can browse to locate authors and references to authors. A similar indexing scheme would be useful in an audio stream, so that users could locate sections where specific speakers were talking. The limited amount of data associated with most video recordings does not provide enough information for the viewer to confidently and easily access desired points of interest. Instead they must peruse the contents of a recording in sequence to retrieve desired information.

Retrieval can be aided by notes taken during the recording, for example notes which indicate the speaker and the topic. While this provides a structural outline, the lack of direct correlation between the video medium and the notation medium forces interpolation of the time stamps on the video with the content of the notes. This is complicated by the fact that notes for events in non-correlated media do not usually include the event's durations. In addition, such notetaking or indexing is quite burdensome. Computer systems may be used for notetaking during events, which may be recorded simultaneously, or pre-recorded. Text-based systems using keyboards may be used in these instances, but since most people talk much faster than they type, creating computer generated textual labels to describe the content in real time requires enormous effort.

Alternatively, the present invention enables retrieval based on indexing an audio stream of a recording according to the speaker. In particular, an audio stream may be segmented into speaker events, and each segment labeled with the type of event, or speaker identity. When speech from individuals is intermixed, for example in conversational situations, the audio stream may be segregated into events according to speaker difference, with segments created by the same speaker identified or marked.

Speaker change markers showing segments corresponding to different speakers in the audio stream may allow random access to otherwise sequential data. In a real-time setting, such audio segmenting may aid in creating a usable index into a recording as it is being made. Each segment represents an utterance by a single individual. Utterances by the same speaker are combined and similarly referenced to form an index. Identification of pauses, or silence intervals, in conversational speech is also important in audio indexing.

Creating an index into an audio stream, either in real time or in postprocessing, may enable a user to locate particular segments of the audio data. For example, this may enable a user to browse a recording to select audio segments corresponding to a specific speaker, or "fastforward" through a recording to the next speaker. In addition, knowing the ordering of speakers can also provide content clues about the conversation, or about the context of the conversation.

Gish et al., "Segregation of Speakers for Speech Recognition and Speaker Identification," Proc. Int. Conf. Acoustics, Speech and Signal Processing, May 1991, vol. 2 pp. 873–876 describe a method for segmenting speech using hierarchical clustering. A dendrogram is constructed based on iteratively merging the pair of segments with smallest distance. The distance between segments is based on the likelihood ratio of two segments being from the same speaker vs. the two segments being from different speakers. The application described involves separating speech from an air traffic controller and various pilots, by identifying the largest cluster in the dendrogram with the controller, and all others with the pilots. They do not discuss methods for separating the pilots, although cuts through the dendrogram might be used.

While this technique could be used for non-real-time speaker segmentation, the present invention offers several improvements. First, the likelihood ratio used by Gish et al. is based on a single Gaussian, while the present method uses tied Gaussian mixtures, which we have shown improves performance. Second, the hierarchical clustering algorithm of the present method recomputes pairwise distances, thus providing effectively longer segments for the distance measure, which is known to improve accuracy. Third, hidden Markov modeling is applied in the present method so that the time resolution of the segmentation is on the order of 20 ms rather than on the several second segments used in the hierarchical clustering. Finally, the present method proposes a resegmentation algorithm which iteratively improves the Hidden Markov Model (HMM)based segmentation.

Siu et al., "An Unsupervised Sequential Learning Algorithm for the Segmentation of Speech Waveforms with Multiple Speakers," Proc. Int. Conf. Acoustics, Speech and Signal Processing, March 1992, vol. 2 pp. 189–192, describe a method for separating several air traffic controllers from pilots. Silence segments are identified first, and initial speech segments are identified as those regions between silence. These segments are grouped into regions containing 50 speech segments, and the assumption is made that in these regions there is a single air traffic controller. Hierarchical clustering is then performed as in Gish et. al., resulting in a cluster for the controller and a cluster for all the pilots. This data is used to initialize a Gaussian mixture model for the controller and the pilots. An Expectation-Maximization (EM) algorithm is then used to iteratively classify the segments as controller or pilot, and re-estimate the mixture models. After convergence, a dynamic programming algorithm is used to improve classification by taking into account speaker duration.

The present invention offers several improvements over Siu et al. As noted above, hierarchical clustering using tied Gaussian mixtures gives better results, as does recomputing the distances. Second, the present use of hidden Markov modeling allows the durational constraints to be accounted for during classification, as opposed to using dynamic programming as a post-processor. Third, the present technique of using tied silence models allows silences to be determined during classification stage, rather than as a pre-processor.

Sugiyama et al., "Speech Segmentation and Clustering Based on Speaker Features," Proc. Int. Conf. Acoustics, Speech and Signal Processing, April 1993, vol. 2, pp. 395–398, discuss a method for segmenting speech when the speakers are unknown, but the number of speakers is known. Their speaker models consist of a single state HMM. Iterative resegmentation is performed, where the speaker models are retrained and the segmentation re-estimated. However, their method has several drawbacks. First, their speaker models are initialized randomly, a technique which is known to produce variable results. Our method describes robust initialization of speaker models. Second, silence is not estimated. And third, the single state speaker HMMs are not as robust as multistate HMMs.

Matsui et. al., "Comparison of Text-Independent Speaker Recognition Methods Using VQ-Distortion and Discrete/Continuous HMMs," Proc. Int. Conf. Acoustics, Speech and Signal Processing, March 1992, vol. 2, pp. 157–160 compare speaker identification methods using HMM speaker models and vector quantization (VQ). However, they do not teach segmentation of speech from multiple speakers.

In the present invention, a real-time system is described for providing segmentation of an audio stream essentially simultaneously with the recording of the audio stream. Training data is provided for training speaker models corresponding to each of the individual speakers before the segmentation is performed.

Hidden Markov Models (HMMs) are used to model individual speakers. Speaker models consist of multiple state HMMs with Gaussian output distributions, and a tied silence model. Such HMMs may be initially trained using Baum-Welch procedures when speakers are known and training data is available. In a post-processing mode, the speaker HMMs can then be iteratively retrained as described below to enhance the segmentation accuracy.

Networks of HMMs are created to model conversational speech including numerous speakers. Using the HMM network, the audio stream is segmented based on the most likely sequence of states through the network. This segmentation may be done in real-time, the segment information being correlated to and stored in conjunction with the audio stream even as it is being created and recorded. In post-recording operation, subsequent retraining of the models and resegmenting of the audio stream may be performed, iterations continuing while changes in segmentation occur from improved models.

When the segmentation is completed, the audio stream is accompanied by an audio index, segregating the audio stream into utterances according to individuals. Non-speech sounds, such as ringing telephones, may also be detected and segmented.

It is an object of the present invention to provide a system for providing real-time segmentation of an audio data stream of conversational speech, representing multiple speakers for which training data is available, according to speaker.

It is a further object of the present invention to provide an index according to speaker for an audio data stream containing multiple known speakers.

SUMMARY OF THE INVENTION

The present invention provides a processor controlled system for correlating an electronic index according to speaker for audio data being recorded in real time. The system includes a source of training data for each of the plurality of individual speakers. An audio input system for provides realtime audio data including speech for the individual speakers. The audio data is converted into spectral feature data by an audio processor, and is at the same time recorded on a storage medium by a recording device. A system processor accepts the training data to create individual speaker models, which are combined in parallel to form a speaker network. The system processor then accepts the spectral feature data of the audio data and, using the speaker network, determines segments in the audio data corresponding to each speaker.

The following description, the drawings and the claims further set forth these and other objects, features and advantages of the invention.

DETAILED DESCRIPTION

A. System Overview

Figure 1:
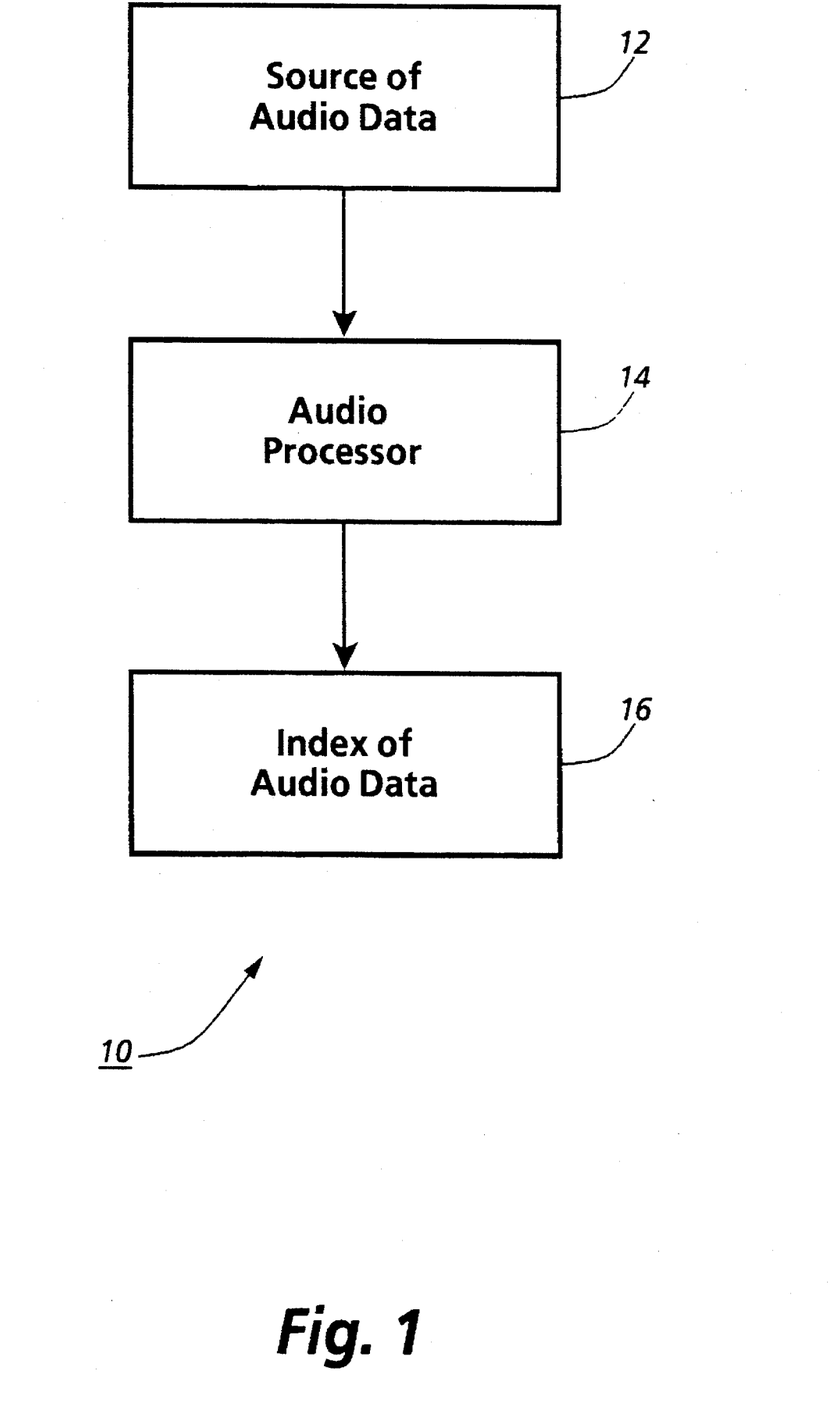
FIG. 1 is a block diagram of a generalized audio processing system within which the present invention may be embodied.

FIG. 1 is a block diagram of a generalized audio processing system 10, within which the present invention may be embodied. Generally, an audio stream is provided from a source of audio data 12, which may be provided by conversational speakers, a recorded video with accompanying audio track, or other audio source. The audio data is sent to an audio processor 14, which may be any well-known device such as a general purpose computer, configured according to the present invention. The audio processor outputs an index of the audio data 16.

Figure 2:
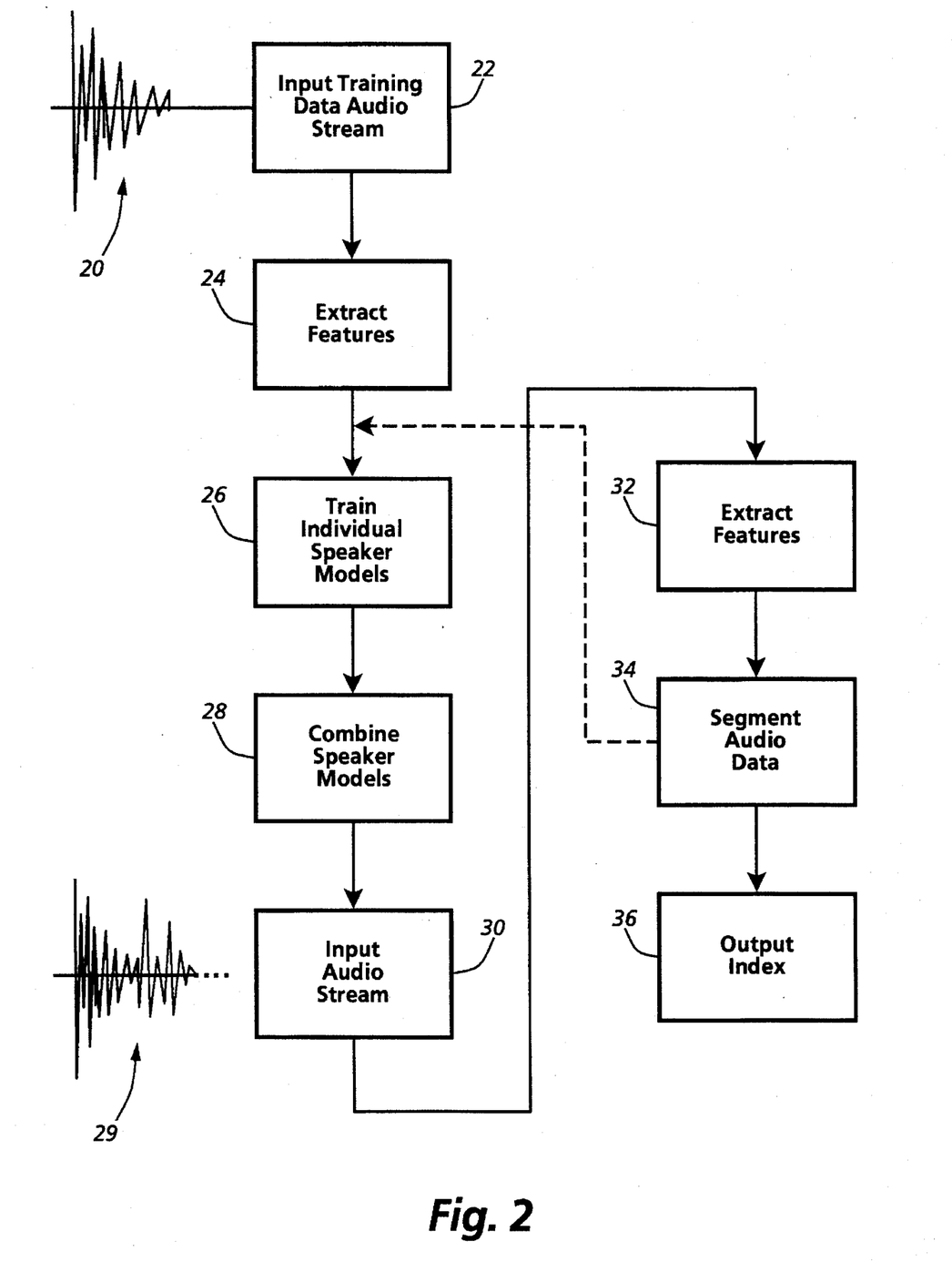
FIG. 2 is a generalized flow diagram of an audio indexing system.

FIG. 2 is a generalized flow diagram of an audio indexing system. The steps shown in FIG. 2 will be discussed in more detail below, but FIG. 2 serves to give an overview of the method described by the invention.

An audio waveform 20, containing training data for a number of known speakers is input in the step in box 22. It is important for such a real-time processing system that training data for each of the speakers must be available in order to prepare the appropriate speaker models before attempting to process the audio data being recorded. The step in box 24 converts the speech signal of prespecified training data into a sequence of spectral feature vectors. For example, a 12th order cepstrum may be computed every 20 ms.

In the step in box 26, HMM speaker models are trained for each speaker based on the initialization data. Multiple individual speaker models are combined in the step in box 28 by connecting the models in parallel to form a conversational HMM speaker network.

The step in box 30 inputs the audio stream 29 on which segmentation is to be performed. The audio stream 29 may or may not contain the training audio data 20 used in the step in box 22. Incoming audio streams may also be generated and segmented in real-time when the speakers are available for pre-training the speaker models. Features are again extracted from the incoming audio in the step in box 32, similar to the feature extraction performed in the step in box 24.

The step in box 34 uses the HMM speaker network of box 28 to segment the incoming audio stream 29. Segmentation is performed using Viterbi decoding to find the most likely state sequence through the speaker network, marking those times when the state path changes speaker.

The accuracy of the segmentation and indexing can be improved in postprocessing applications by returning to the step in box 26 to retrain the speaker models, using the segmentation information obtained in the step in box 34. Typically more speech information will be available per speaker based on the segmentation information, allowing more detailed speaker models to be determined. Iterations of retraining and resegmenting may be continued until no significant changes in the segmentation occur in the step in box 34. The resulting index indicating audio segments and speakers are output in the step in box 36. The results of the feature extraction in the step in box 32 may also be saved to be reused with each retraining iteration to resegment the audio data in the step in box 34.

B. Hidden Markov Models

Hidden Markov modeling is a statistical technique commonly used in speech recognition to model whole words, or sub-word units such as phones. Recognition of an unknown utterance is based on finding the model, or sequence of models, which are most probable given the unknown utterance. HMMs can also be used in speaker identification. A model is created for a speaker's pronunciation, either of specific words or of spontaneous speech. Speaker identification is performed by finding the speaker whose model is most likely given the unknown utterance. If the unknown utterance contains speech from multiple speakers, then speakers are identified by finding the most likely sequence of speaker models.

In the abstract, an HMM consists of a sequence of states, with transitions occurring between states at fixed time intervals. Each time a transition is made into a state, an output characteristic of that state is generated. In both speech recognition and speaker identification, these outputs represent a spectral estimate of the speech for that time interval, for example the cepstrum. The cepstrum is an estimate of the spectral envelope commonly used in speech recognition and speaker identification. It is the inverse Fourier transform of the log spectrum, and serves to deconvolve the spectral envelope and the periodic voicing source.

Transitions between states specify the sequence of outputs. By associating probabilities with the transitions between states, as well as with the outputs of each state, HMMs can be used to statistically model speech. The term hidden is used, because only the outputs of the system are seen—the underlying state sequence can only be inferred.

Figure 3:
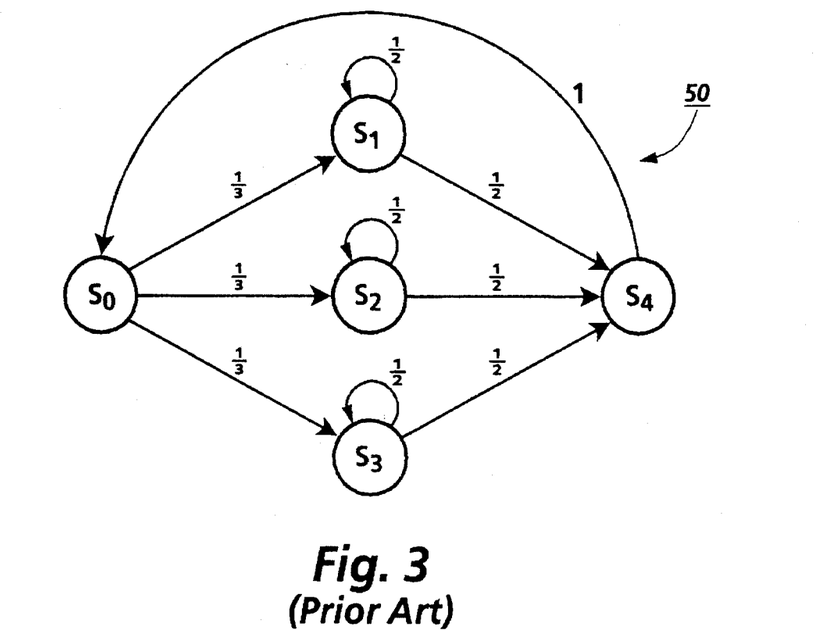
FIG. 3 shows a five state Hidden Markov Model (HMM).

More formally, a HMM L consists of N states $S_0 \ldots S_{N-1}$, the transition probabilities $a_{i,j}$, i=0 $\ldots$ N-1, j=0 $\ldots$ N-1, where $a_{i,j}$ is probability of a transition from state i to state j, and the probability distributions $b_i(x)$, i=0 $\ldots$ N-1, where $b_i(x)$ is the probability, given in state i, of generating the output x. For example, $b_i(x)$ could be a multivariate Gaussian distribution for the feature vector x. In addition, there are null states which can be visited but produce no output. FIG. 3 shows a five state HMM. The transition probabilities from state $S_0$ to states $S_1$, $S_2$ or $S_3$ are uniform, that is, $a_{0,j}=\frac{1}{3}$, j=1, 2, 3. For states $S_i$, i=1,2,3, there are self transitions and transitions to state $S_4$, each equally likely. Thus $a_{i,i}=\frac{1}{2}$ and $a_{i,4}=\frac{1}{2}$ for i=1, 2, 3. For state $S_4$, a transition is always made to state $S_0$, thus $a_{4,0}=1$. Associated with states $S_1$, $S_2$, and $S_3$ are output distributions $b_1(x)$, $b_2(x)$ and $b_3(x)$ respectively. States $S_0$ and $S_4$ are null states, and thus have no associated output distributions. Note that an equivalent HMM can be formed by combining states $S_0$ and $S_4$. However, this is not done to simplify the task of combining HMMs into a larger HMM network, as will be described below. A more in depth discussion of HMMs may be found in Rabiner, "A Tutorial on Hidden Markov Models and Selected Applications in Speech Recognition", Proc. IEEE, Vol. 77, No. 2, February, 1989, pp. 257–285.

Figure 4:
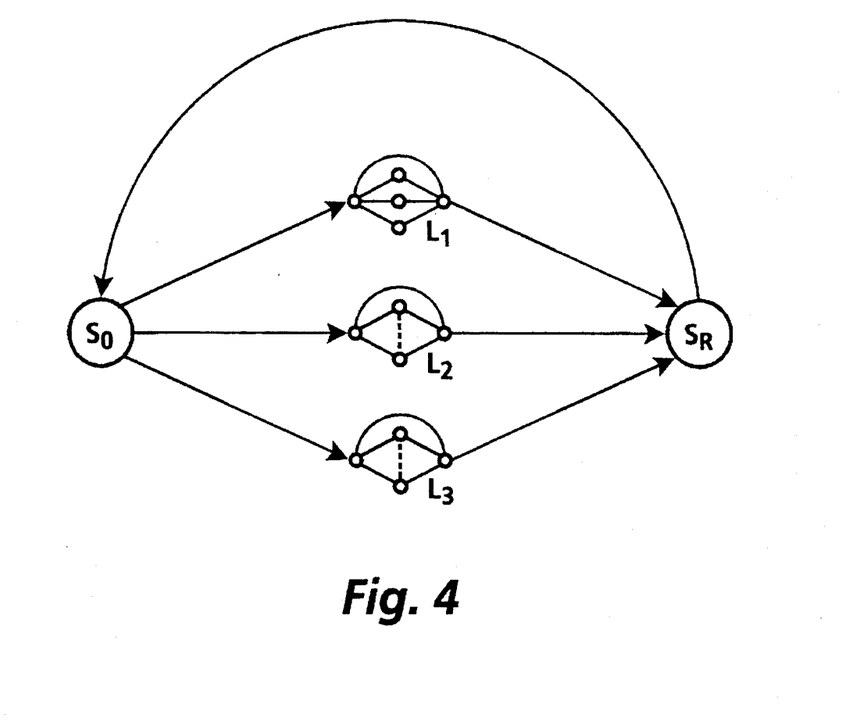
FIG. 4 shows an HMM network of three objects modeled by HMMs.

A network HMM modeling a sequence of objects is created by connecting individual HMMs in parallel, as follows. Let $L_i$, i=1, $\ldots$ , M be the HMMs for each of the L objects to be recognized. As noted previously, objects can be either words, phones or speakers. The network HMM is created by adding transitions between the object HMMs for all allowable sequences of objects. In FIG. 4, three objects are modeled by HMMs $L_1$, $L_2$ and $L_3$. These objects can occur in any order, as shown by the transitions. State $S_0$ is a null state, and thus produces no output. From $S_0$, it is equally probable to transition to the object HMMs $L_1$, $L_2$ and $L_3$. The exit from all object HMMs is to state $S_R$, which in turn transitions to state $S_0$.

Figure 5:
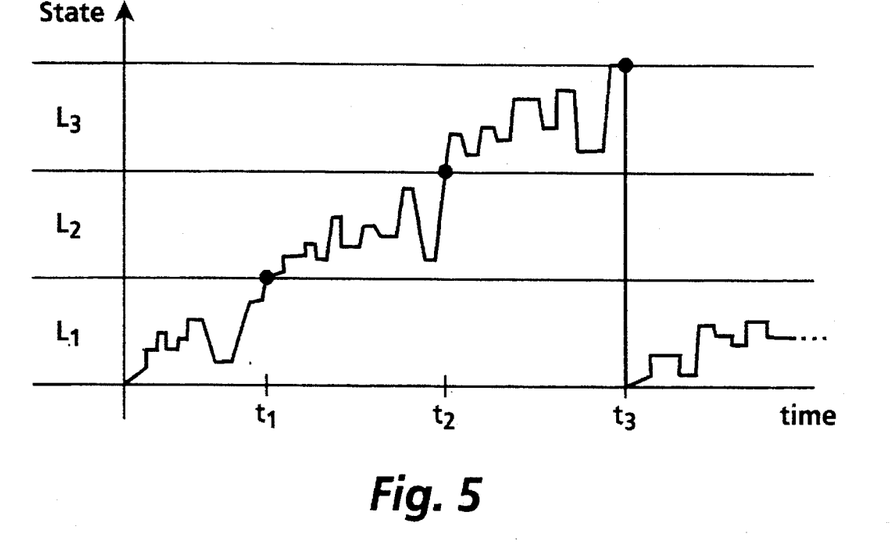
FIG. 5 illustrates the results of the Viterbi algorithm.

Given a sequence of T outputs $X=x_1 \ldots x_T$, recognition is performed by determining which sequence of object HMMs most likely generated the output sequence X. This is done using a Viterbi algorithm to find the sequence of states through the network that most likely generated the output X. Because each state in the sequence is specific to the HMM of one of the objects to be recognized, the most likely state sequence specifies sequence of objects recognized. FIG. 5 illustrates the results of the Viterbi algorithm. The x-axis indicates time, and the y-axis indicates the current state in the network HMM. States corresponding to the HMMs $L_1$, $L_2$ and $L_3$ are indicated by regions on the y-axis. While there are many possible state sequences that could have resulted in the given output, the Viterbi algorithm finds the most probable one. FIG. 5 shows the Viterbi path. At time $t_0$, the most likely object is $L_1$. At time $t_1$, the object is $L_2$, and at $t_2$, the object is $L_3$. At time $t_3$, the most likely object becomes $L_1$.

The parameters for an HMM, then, are the transition probabilities $a_{i,j}$ and the output probabilities $b_i(x)$. These parameters can be learned by training the HMM with outputs X known to have been generated by the object modeled by the HMM. An algorithm know as the Baum-Welch procedure is commonly used. This is an algorithm which iteratively finds values of the parameters that maximize the likelihood of the training data X. The algorithm begins with an initial guess of the parameters. Then, the following steps are performed: (1) computing the probability of transitions between states, and the probabilities of outputs from the states, based on the training data, and (2) using these probabilities to compute estimates of the transition probabilities $a_{i,j}$ and output probabilities $b_i(x)$. Steps (1) and (2) are repeated until convergence. A more thorough description of this algorithm may also be found in Rabiner.

C. Speaker SubNetworks

Figure 6:
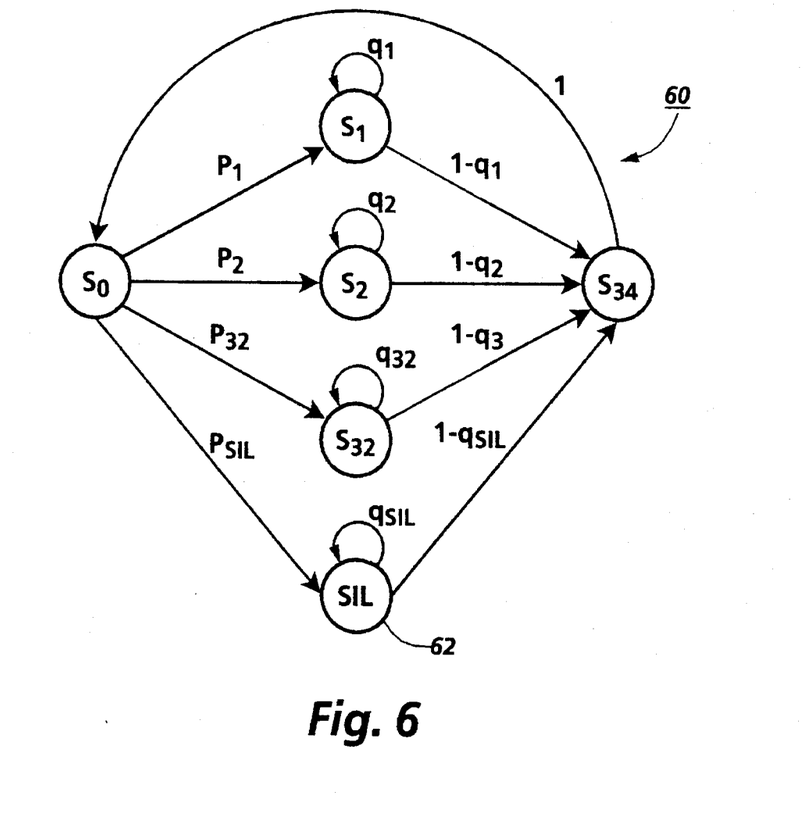
FIG. 6 shows a 35 state HMM modeling the speaking style of an individual.

As mentioned above, Hidden Markov Models can be used to model individual speakers for the purpose of speaker identification. As shown in FIG. 6, the speaking style of an individual (as opposed to a specific utterance) may be modeled using an HMM 60 with states. State $S_0$ is a null state, with transitions to output-producing states $S_1, \ldots, S_{32}$ and $S_{SIL}$. The probabilities of these transitions are given by $P_1, \ldots, P_{32}$ and $P_{SIL}$. Each of these output-producing states has a self-transition, with probability $q_i$, and a transition to the final null state $S_{34}$ with probability $1-q_i$. The null state $S_{34}$ transitions to the initial null state $S_0$ with probability 1. Each non-null state has a Gaussian output distribution, characterized by a mean vector and a diagonal covariance matrix.

Figure 7:
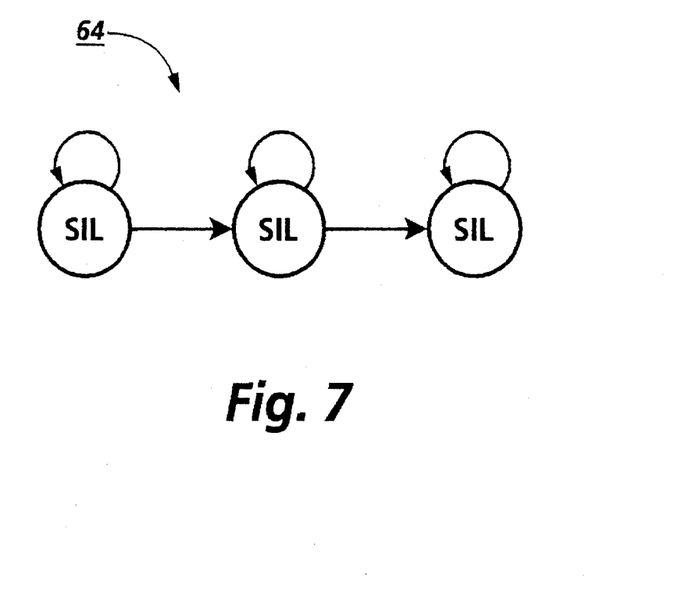
FIG. 7 shows a silence sub-network.

FIG. 7 shows silence sub-network 64. It consists of 3 states, connected serially. Each state has a common or tied Gaussian output distribution, as indicated by the label SIL. This output distribution is also identical to the output distribution in silence state 62 in speaker model 60, as indicated by the state label SIL. The silence sub-network models long periods of silence, but is not appropriate for pauses, or brief silence intervals in conversational speech. These are modeled by the silence state 62 in the individual speaker model. The output distributions in the silence states of the speaker HMMs are all tied to the output distributions in the silence sub-network.

Each speaker HMM must be trained to the speaking style of a given speaker. This is done by using the Baum-Welch algorithm described in the previous section to estimate the transition probabilities $a_{i,j}$ and the means and diagonal covariances for the Gaussian output probabilities $b_i(x)$. Initial estimates of the HMM parameters are obtained as follows. All transition probabilities are set uniformly, so that all transitions from a given state are equally likely. In order to initialize the Gaussian output distributions, a grand mean and diagonal covariance matrix is computed from the training data for the speaker. The covariance matrix for the Gaussian output distributions for all states is set to the grand covariance matrix. The means are set by adding a small constant to the grand mean, where the constant is added to a random component for each different state. The Baum-Welch iteration is then performed using the speaker's training data.

When the speakers to be recognized are known beforehand, training data for the Baum-Welch algorithm is obtained by using 30 seconds to 1 minute of speech data for each speaker. The speech should represent the usual speaking style of the speaker—the actual words used are unimportant.

In addition to the speaker and silence sub-networks, a garbage sub-network is often used to model any speaker not specified by one of the speaker models, or possible non-speech sounds. The form of the garbage network is the same as that of a speaker network, as shown in FIG. 6. However, depending on the application, the garbage network is trained using different data. For instance, if the garbage sub-network is used to model non-speech sounds, it should be trained as a speaker model, but using the non-speech data. If it is to model speakers not known to the system, one way to obtain training data is to use portions of speech from each of the known speakers.

It is important to note that not all the data from all the speakers is used when training the garbage model. Using all the available data would give much more training data to the garbage model than to each speaker model, and has the effect of creating a more robust speaker model for all of the speakers. The resulting HMM network then classifies most speech as garbage.

In one implementation, input audio training data is sampled at 8 KHz, and feature vectors computed every 10 ms. For example, a feature vector for each frame may be computed by performing 20th order Linear Predictive Coding (LPC) analysis of the samples under a 25 ms window, and then computing 20 cepstral coefficients from the LPC spectrum.

In some cases, the speakers to be recognized are not known beforehand. However, it is still necessary to obtain initial estimates for the speaker models. This is done using a hierarchical agglomerative clustering algorithm to create a rough partition of the data to be recognized into different speakers.

D. Speaker Segmentation Network

Figure 8:
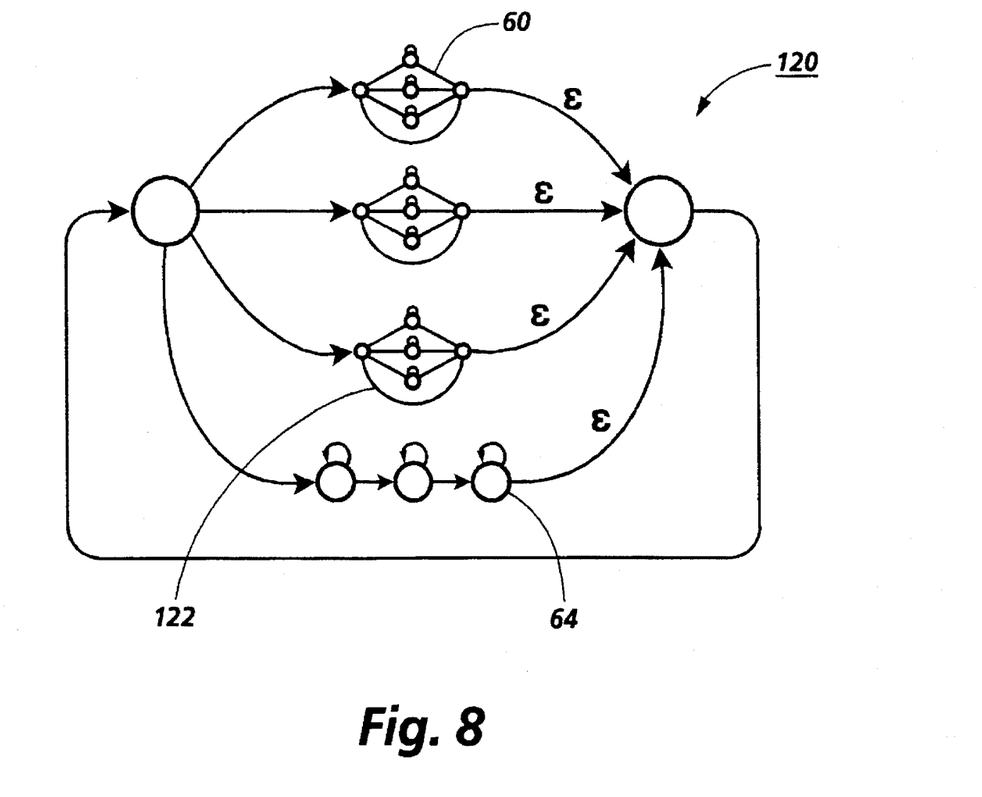
FIG. 8 shows a speaker segmentation network composed of a sub-network for each speaker, and optional sub-networks for silence and garbage.

The speaker segmentation network 120, shown in FIG. 8, is composed of a sub-network 60 for each speaker, and optional sub-networks for silence 64 and garbage 122. Garbage is defined as speech or sound not modeled by the speaker or silence models, such as an unknown speaker or non-speech sounds in the audio. Speaker, garbage, and silence sub-networks are obtained as described above. The network models conversations by two or more speakers, with possible background noise.

Individual speaker sub-networks such as network 60, are connected to each other in parallel, and transition probabilities out of each sub-network are fixed to a small "penalty" constant $\epsilon$ to discourage speaker change based on isolated samples. Each speaker sub-network 60 consists of an HMM with L states, connected in parallel. Each state has a Gaussian output distribution, a self transition and an exiting transition.

Transition probabilities from the initial null state to the speaker, garbage and silence sub-networks are uniform. The transition probability penalty out of speaker, garbage and silence models is set to a constant ϵ. In principle, these transition probabilities could depend on the speaker, and could be learned during training. However, for simplicity, the prior probability of a speaker is assumed to be uniform, and the speaker exiting probability ϵ is selected empirically to discourage speaker change based on isolated samples.

In practice, this transition probability is extremely small (on the order of $10^{-20}$). Thus the transitions out of each speaker model serve to penalize switching from speaker to speaker.

E. Segmentation of Audio Stream

Indexing a conversation between speakers is simply a matter of finding the most likely state sequence through the network model, given a sequence of observed feature vectors. After the speaker sub-networks have been initialized, speaker segmentation is performed by finding the most likely state sequence through the speaker segmentation network, and marking those times when the state path changes speaker. Speaker changes occur when the optimal state switches from one speaker model to another. Finding the optimal state sequence is accomplished by using the Viterbi algorithm. The accuracy of the segmentation can be improved by retraining the speaker sub-networks using the segmented data. This process of segmenting and retraining is repeated until there is no further change in segmentation.

The technique of partial traceback, or continuous decoding is used in the Viterbi search. Partial traceback is described in Brown et al., "Partial Traceback and Dynamic Programming," Proc. Int. Conf. Acoustics, Speech and Signal Processing, May, 1992, pp. 1629–1632. In this algorithm, the Viterbi traceback is performed at each time step from all states, and decoding is possible when the initial portions of all paths agree. In practice, the delay incurred is less than a second.

In post-processing applications, segmentation of speech may be performed iteratively, with speaker models being retrained after each segmentation.

This increases the accuracy of the segmentation, particularly when speaker training data is not available.

Figure 9:
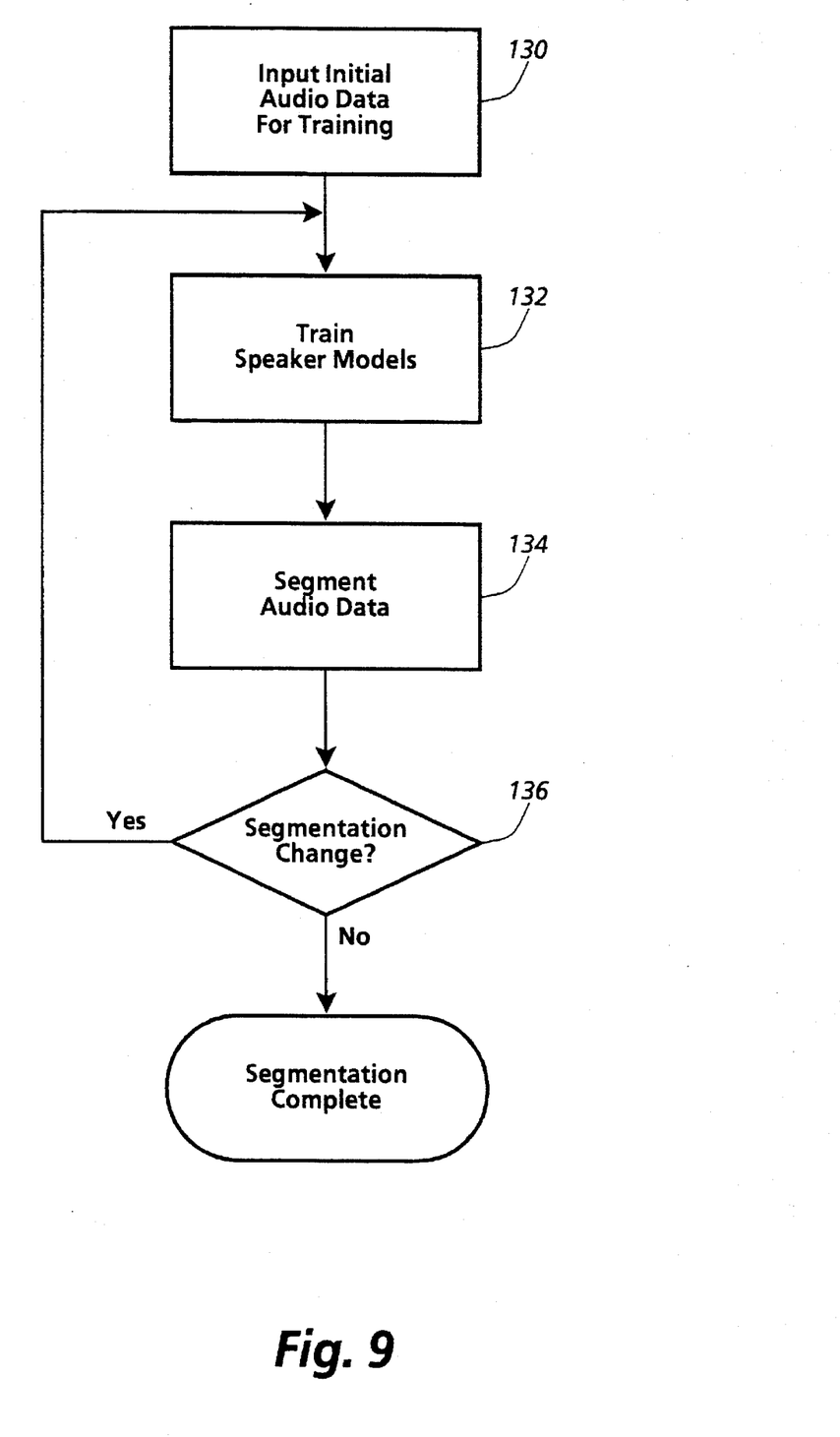
FIG. 9 illustrates an iterative resegmentation algorithm.

An iterative resegmentation algorithm is shown in FIG. 9. As described above, a set of training data is initially provided in the step in box 130 to train the speaker models in the step in box 132. Segmentation is then performed in the step in box 134 based on these speaker models. If the segmentation in the step in box 134 changes significantly, this improved segmentation is used as new training data for the speakers, and the speaker models are retrained in the step in box 132. This process continues until the segmentation remains unchanged in the step in box 136.

F. Application for Real-Time Processing with Known Speakers

Figure 10:
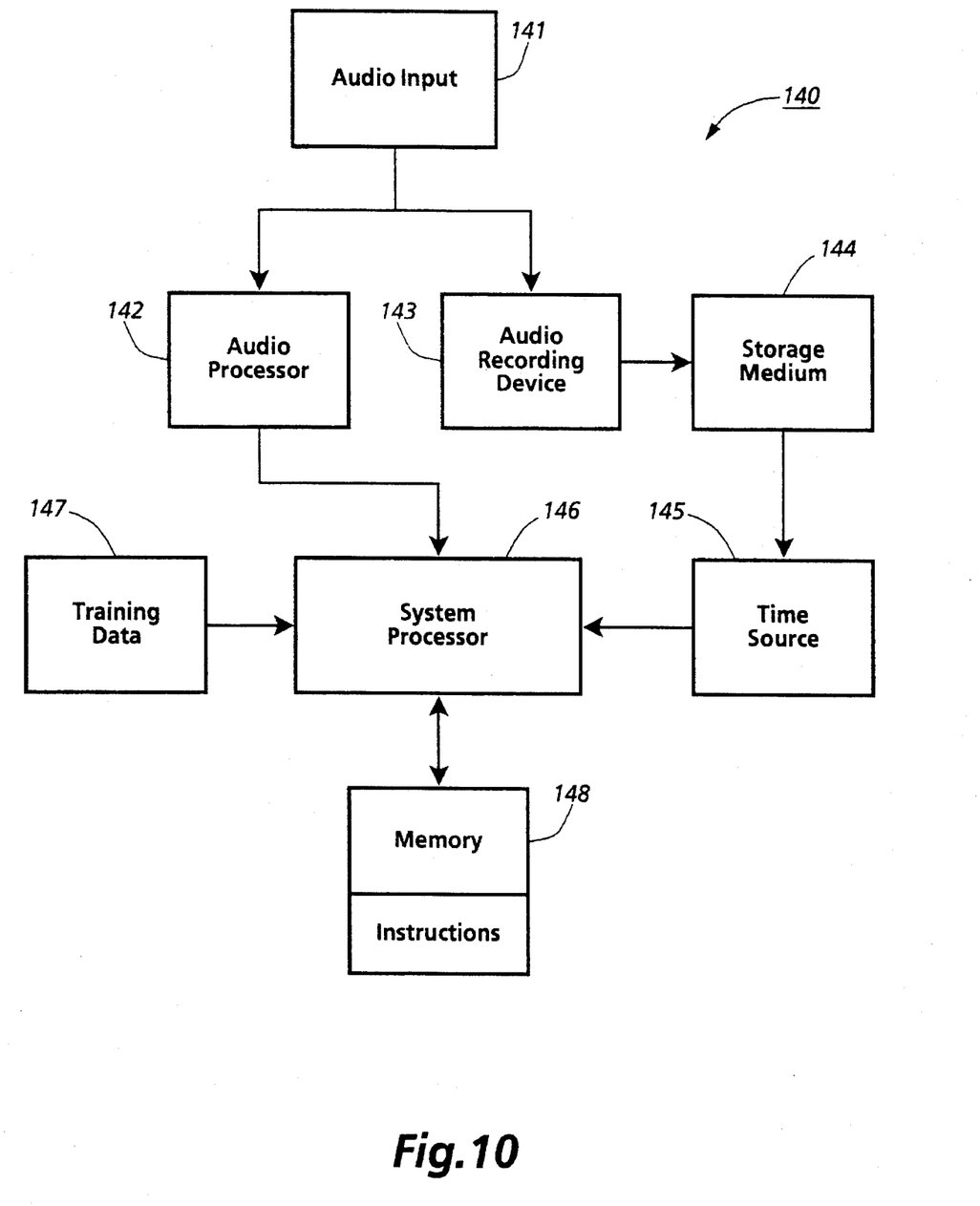
FIG. 10 shows a system of the present invention for creating an index of audio data in real-time, as the audio data is being stored by a recording device onto a storage medium.

FIG. 10 shows a system 140 of the present invention, for creating an index of audio data in real-time, as the audio data is being stored by a recording device onto a storage medium.

System processor 146, which obtains instructions from memory 148, receives training data 147 to determine speaker models. The speaker models are combined to form a speaker network for later audio stream processing. Training data 147 must contain training data for each speaker that is to be identified. As shown in FIG. 10, training data 147 has already been processed from its original audio waveform, and is furnished to system processor 146 in the form of spectral feature data.

Audio input 141 is processed by audio processor 142 into spectral feature data, and provided to system processor 146. Simultaneously, the audio input is recorded by audio recording device 143 onto a storage medium 144. Recording device 143 may store the audio stream information in either analog or digital form, and may be a purely audio recording, or part of an audio/video record.

Spectral data is processed by system processor 146 by using the speaker network created by system processor 146 from the training data 147. As each new segment is detected in the audio stream, system processor 146 obtains a timestamp from time source 145, which indicates the storage time of that audio data on storage medium 144. Time source 145 may be, for example, a clock which is started when the recording is started, or may be a device for recording a time from the recording device connected to the storage medium. This timestamp, along with an identifier of the creator of the segment, is stored in memory 148 for later collection into an index according to speaker.

Figure 11:
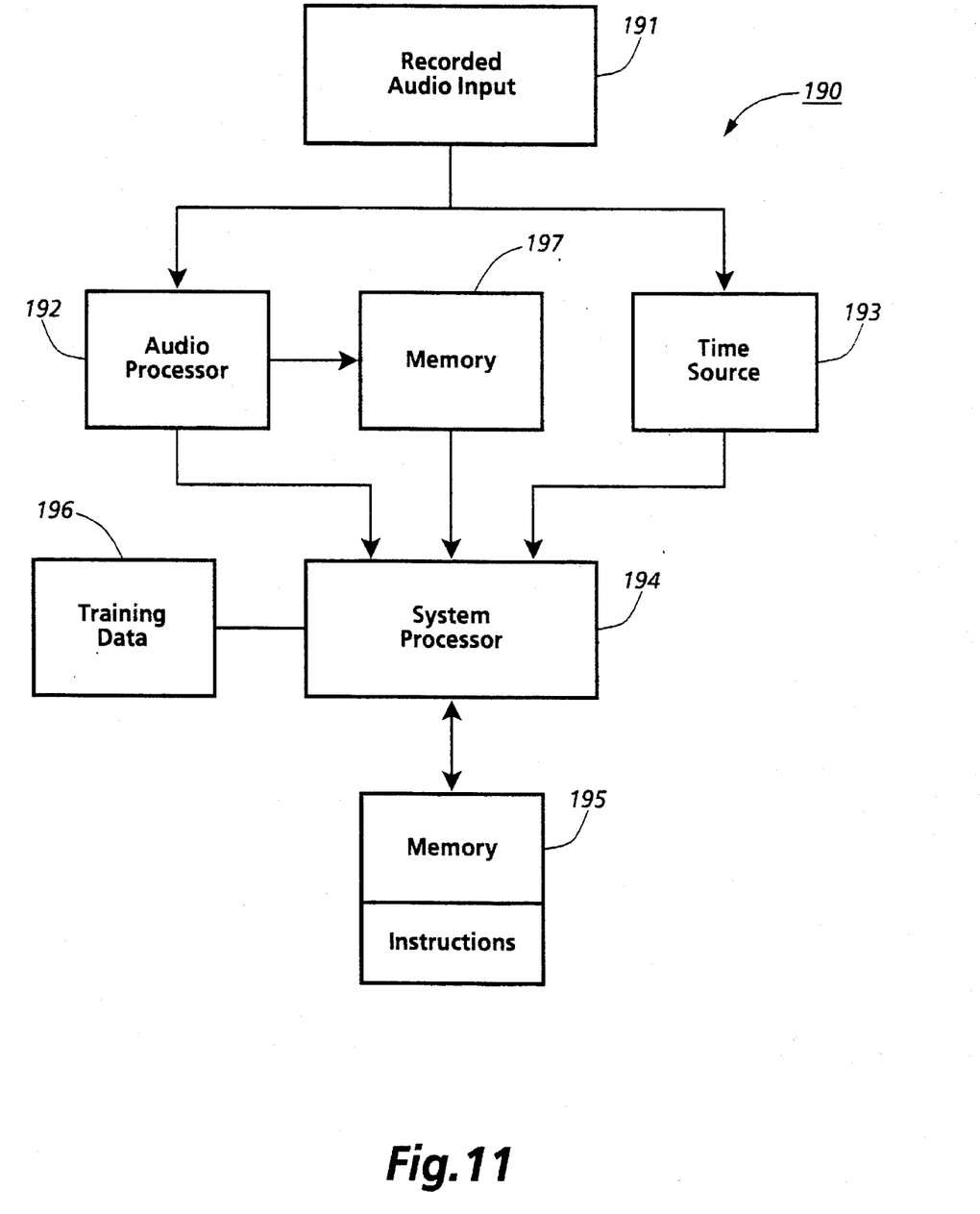
FIG. 11 shows another embodiment of the present invention in a system for creating and storing an index according to speaker of pre-recorded audio data.

FIG. 11 shows another embodiment of the present invention in system 190, for creating and storing an index according to speaker of recorded audio data.

Training data 196 is provided to system processor 194 for producing speaker models and a speaker network. Training data 196 must contain training data for each speaker that is to be identified. As shown in FIG. 11, training data 196 has already been processed from its original audio waveform, and is furnished to system processor 194 in the form of spectral feature data. Training data may also be part of recorded audio input 191, if portions of the recording can be isolated for each identified speaker.

Recorded audio input 191 is processed by audio processor 192 into spectral feature data and provided to system processor 194. The spectral feature data may be stored in a memory 197 for use in later iteration by system processor 194.

Spectral data is processed by system processor 194 by using the speaker network created by system processor 194 from the training data 196. As each new segment is detected in the audio stream, system processor 194 obtains a timestamp from time source 193, which indicates the recording address, or storage time, of that audio data from the recording of audio input 191. Time source 193 may be, for example, a clock which is started when the recording is started, or may be a device for recording a time from the recording device connected to the storage medium. This timestamp, along with an identifier of the creator of the segment, is stored in memory 195 for later collection into an index according to speaker.

It should be noted that audio data recorded by system 140 in FIG. 10 may be used as recorded data 191 in system 190 of FIG. 11. In such a case, the index created by system 140 may be used to provide training data 196, each collection of segments attributed to a particular speaker being used as training data to train a new speaker model. System processor 194 would use the new speaker models, combined into a network, to resegment the audio stream.

Such iterations, whether from system 140 to system 190, or through system 190 iteratively, may provide further accuracy in the segmentation.

Figure 12:
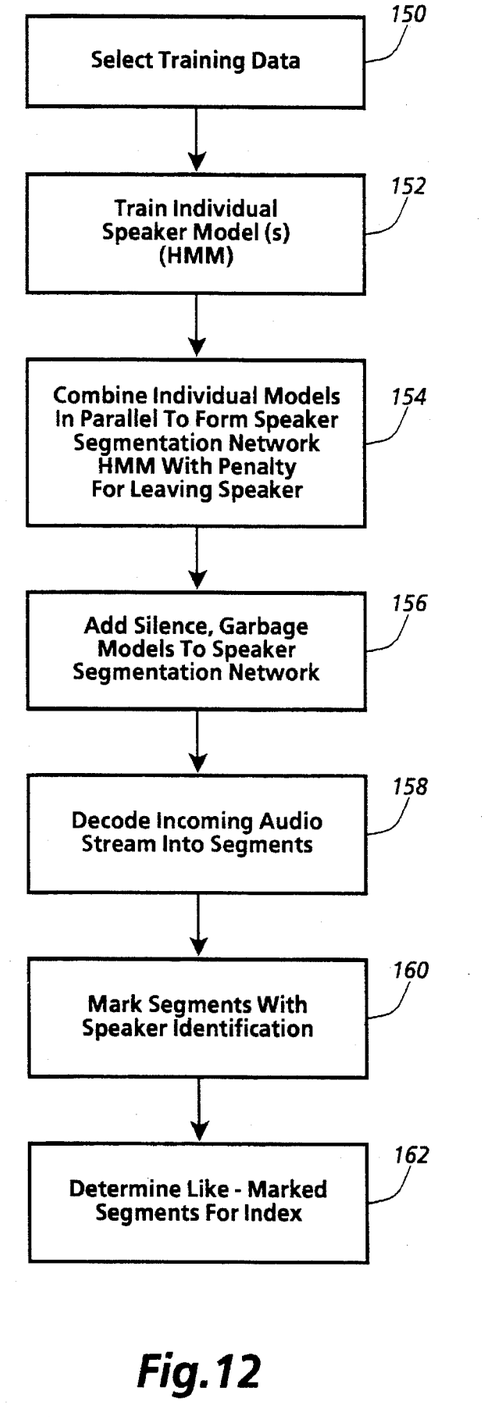
FIG. 12 describes the application of the techniques described above to determine an index of an audio stream.

FIG. 12 describes the application of the techniques described above to determining an index of an audio stream.

The steps shown in FIG. 12 may be performed in either real-time or post-processing mode. The audio stream may typically be recorded, with the segment information correlated to the audio timing. The step in box 150 selects training data from the known speakers. As described above, such training data may consists of a 30 seconds to a minute of speech by an individual speaker. This training data is used in the step in box 152 to train HMM speaker models for each individual.

In the step in box 154, the individual models are combined in parallel, as described in relation to FIG. 8, to form a speaker segmentation network. At this time, penalties for exiting an individual speaker model are inserted. The step in box 156 creates and adds models for garbage—unknown speakers and/or non-speech sounds—and for silence intervals. Note that these silence and garbage models may also have been created in the step in box 152.

In the step in box 158, the audio stream is segregated into segments, using the speaker segmentation network. The segments are marked with identification of the speaker for each segment in the step in box 160. The step in box 162 collects segments that are similarly marked to create an index of speakers of the audio record.

Figure 13:
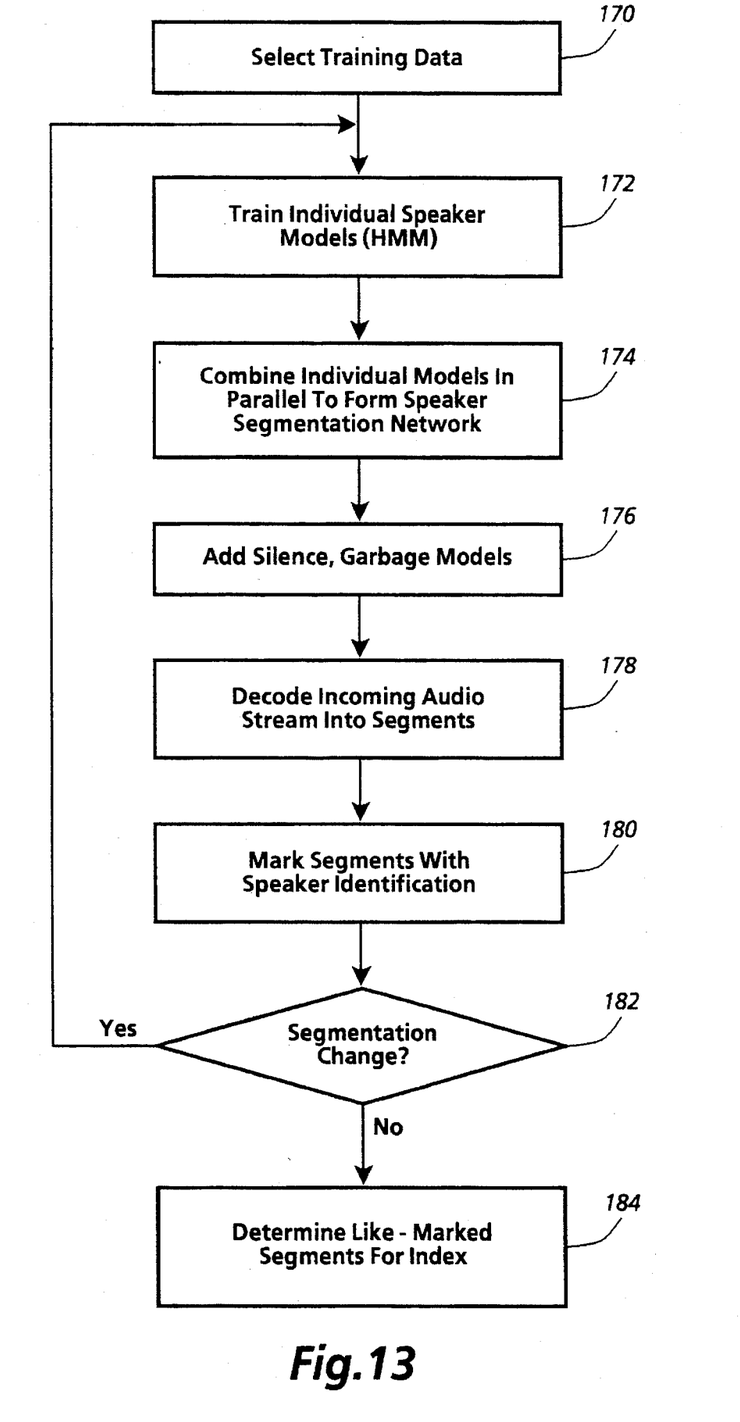
FIG. 13 describes more detailed processing that may be performed in determining an index of an audio stream.

When real-time operation is not necessary, more detailed processing may be performed as described in relation to FIG. 13. The steps shown in boxes 170 through 180 are performed in the same manner as described in relation to the steps shown in boxes 150 through 160 of FIG. 12.

In the step shown in box 182, a test is performed to determine if the segmentation determined in the step in box 178 has changed from the previous segmentation. If there were significant changes in the segmentation, then the system returns to the step in box 172 to retrain the speaker models, and resegment the audio stream. The first time through the sequence there will be no previous segmentation, and the system will go through the iteration just described. When the iteration does not produce any significant changes in the segmentation of the audio stream, like-marked segments may be collected to create an index in the step in box 184.

G. Miscellaneous

Indexing information may give users an ability to search and control playback of an audio stream based on speaker identities. For example, a user may wish to locate only utterances spoken by a particular speaker. A user may further use audio indexing information to browse" through an audio record. The user may wish to skip through some speaker segments, effectively "fast-forwarding" to a next speaker, or "rewinding" to the beginning of a particular speaker segment.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A processor controlled system for electronically indexing audio data being recorded in real time, said audio data comprising speech from a plurality of individual speakers, the processor controlled system electronically indexing the audio data according to speaker, the system comprising:

a training data source for providing spectral feature training data for each of the plurality of individual speakers;

a system processor for receiving the training data and producing a speaker model for each of the plurality of individual speakers, each speaker model having an associated speaker identifier, said system processor further combining said speaker models into a speaker network;

an audio input system for providing real time audio data comprising speech from the plurality of individual speakers;

an audio processor for receiving said audio data and converting said audio data into spectral feature data;

a recording device for receiving said audio data and recording said audio data on a storage medium according to a received time;

memory for storing data, the data stored in the memory including instruction data indicating instructions the processor executes;

said system processor further accessing the data stored in the memory;

said system processor, in executing the instructions, receiving said spectral feature data from said audio processor and, using said speaker network, determining segments of said audio data which correspond to different individual speaker models;

said system processor further determining at the start of each segment a timestamp, said timestamp corresponding to the received time for that segment on said storage medium, said system processor storing said timestamp in said memory;

said system processor further storing said speaker identifier of said individual speaker model for each segment in said memory in conjunction with said storage medium location address for that segment.

2. The system of claim 1, said system processor producing for each of the plurality of individual speakers an individual Hidden Markov Model (HMM) speaker model.

3. The system of claim 2, said system processor further combining said individual Hidden Markov Model (HMM) speaker models in parallel to construct a speaker network HMM.

4. The system of claim 3, wherein said system processor, in determining segments of said audio data which correspond to different speaker models, determines an optimal path through the speaker network HMM, identifying segments of said audio data associated with different individual HMM speaker models.

5. The system of claim 1, wherein said system processor further collects a set of segments associated with each speaker identifier.

6. The system of claim 5, wherein said recording device is further connected for providing said recorded audio data to said audio processor to be converted into new spectral feature data;

said system processor using collected segments associated with each speaker identifier to produce new speaker models for each of the plurality of individual speakers, said system processor further combining said new speaker models into a new speaker network;

said system processor further receiving said new spectral feature data and, using said new speaker network, determining segments of said audio data which correspond to different new individual speaker models; said system processor further determining at the start of each segment a timestamp, said timestamp corresponding to the received time for that segment on said storage medium, said system processor storing said timestamp in said memory; said system processor further storing said speaker identifier of said new individual speaker model for each segment in said memory in conjunction with said timestamp for that segment.

7. The system of claim 1, wherein said system processor, in receiving said training data, further produces a garbage model from portions of each training data for each of the plurality of individual speakers, said garbage model further being combined into said speaker network.

8. The system of claim 1, wherein said system processor further produces a silence model, said silence model further being combined into said speaker network.

* * * * *